(12) United States Patent
Sakaguchi et al.

(10) Patent No.: US 7,285,510 B2
(45) Date of Patent: Oct. 23, 2007

(54) GLASS COMPOSITION FOR POLING AND GLASS FUNCTIONAL PRODUCT CONTAINING THE SAME

(75) Inventors: Koichi Sakaguchi, Osaka (JP); Shigeki Nakagaki, Osaka (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 234 days.

(21) Appl. No.: 10/742,251

(22) Filed: Dec. 19, 2003

(65) Prior Publication Data

US 2004/0138044 A1 Jul. 15, 2004

(30) Foreign Application Priority Data

Dec. 25, 2002 (JP) .............................. 2002-373467

(51) Int. Cl.
*C03C 3/083* (2006.01)
*C03C 3/091* (2006.01)
*C03C 3/087* (2006.01)

(52) U.S. Cl. ........................... 501/68; 501/66; 501/69; 501/70

(58) Field of Classification Search ................ 501/66, 501/68, 69, 70
See application file for complete search history.

(56) References Cited

U.S. PATENT DOCUMENTS 3,464,806 A * 9/1969 Shigeru et al. .............. 65/32.4
3,496,401 A * 2/1970 Dumbaugh, Jr. ............ 313/579
4,060,423 A * 11/1977 Thomas ........................ 501/70
5,108,961 A * 4/1992 Zhong et al. ................. 501/65
5,239,407 A 8/1993 Brueck et al.
5,651,804 A * 7/1997 Debnath .................... 65/30.13

FOREIGN PATENT DOCUMENTS

| EP | 1 262 462 | | 12/2002 |
| JP | 73010047 B | * | 3/1973 |
| JP | 7-306426 | | 11/1995 |
| JP | 07306426 A | * | 11/1995 |
| WO | 97/46906 | | 12/1997 |

OTHER PUBLICATIONS

"Refractive index of silica glass: influence of fictive temperature", Haken et al.., Journal of Non-Crystalline Solids, vol. 265,2000., pp. 9-18.
"Large second-order nonlinearity in poled fused silica", R.A. Myers et al., Optics Letters vol. 16, No. 22, Nov. 15, 1991, pp. 1732-1734.

* cited by examiner

*Primary Examiner*—J. A. Lorengo
*Assistant Examiner*—Elizabeth A Bolden
(74) *Attorney, Agent, or Firm*—Hamre, Schumann, Mueller & Larson, P.C.

(57) ABSTRACT

The present invention provides a glass composition suitable for producing a poling effect. This glass composition includes 0.001 to 0.5 mol % of univalent metal ions in terms of oxide thereof, 0.1 to 40 mol % of $Al_2O_3$, and 0 to 15 mol % of $B_2O_3$, and a ratio of the number of moles of $Al_2O_3$ to a sum of moles of oxide in terms of which the univalent metal ions is expressed is at least 1.0. As the univalent metal ions are suitable Li, Na, K, Cs, Ag, Cu, and Au.

8 Claims, No Drawings

GLASS COMPOSITION FOR POLING AND GLASS FUNCTIONAL PRODUCT CONTAINING THE SAME

BACKGROUND OF THE INVENTION

1. Field of the Invention

The present invention relates to a glass composition suitable for poling and a glass functional product containing the glass composition. Poling is used for forming nonlinear optical elements that are used, for example, in the field of optical communications.

2. Related Background Art

The generation of the second harmonic induced by a second-order nonlinear optical effect can be achieved by introducing a periodic polarization structure into a dielectric material. This technique has advantages that, for example, when compared to the case of using a dielectric crystal, no operation for precise phase matching is necessary and the material to be used is not required to have a specific crystal structure. The polarization structure can be introduced through a polarization process (a poling process) carried out by, for example, applying high voltage to the dielectric material. The poling process causes semipermanent polarization (a poling effect). Particularly, a thermal poling process in which high voltage is applied while heating glass is easy to operate and also is excellent in maintaining the poling effect.

Various studies have been made about poling of silica glass used for optical fibers for optical communications. The poling effect in silica glass is brought through the migration of sodium ions contained as impurities in an electric field (see, R. A. Myers, Optical Letters, vol. 16, 1991, p1732). It has been understood that a depletion layer in which the concentration of sodium ions has decreased due to the migration of sodium ions is formed in glass and an internal electric field is generated therein to produce the nonlinear optical effect.

U.S. Pat. No. 5,239,407 discloses that a greater second-order nonlinear optical effect is obtained by thermal poling of fused silica glass. Furthermore, WO97/46906 describes that in order to produce a great electro-optic effect in optical fibers made of silica glass, it is effective to carry out thermal poling at a high temperature that is at least 450° C. and to apply a strong electric field that is at least 800 V/μm.

In the silica glass that has been used conventionally, however, sodium ions contained as impurities simply are used for poling.

SUMMARY OF THE INVENTION

The present invention is intended to create a glass composition suitable for producing a poling effect and to provide a glass functional product using this composition.

The present invention provides a glass composition for poling that includes 0.001 to 0.5 mol % of univalent metal ions in terms of oxide thereof, 0.1 to 40 mol % of $Al_2O_3$, and 0 to 15 mol % of $B_2O_3$, wherein a ratio of the number of moles of $Al_2O_3$ to the sum of moles of oxide in terms of which the univalent metal ions is expressed is at least 1.0.

Univalent ions migrate along an electric field direction upon application of voltage to glass and thereby a depletion layer is formed in the glass. Ionized Al reduces activation energy for the migration of the univalent ions and further prevents the ions that have migrated from recombining with electrons.

DETAILED DESCRIPTION OF THE INVENTION

The glass composition of the present invention preferably has the following composition range in terms of mol %:
0.001% to 0.5% of univalent metal ions in terms of oxide thereof
0.1 to 40% of $Al_2O_3$;
50 to 97% of $SiO_2$;
0 to 15% of $B_2O_3$;
0 to 25% of MgO;
0 to 25% of CaO;
0 to 25% of SrO;
0 to 25% of BaO; and
0 to 25% of ZnO, wherein a preferable range of the sum of the contents of MgO, CaO, SrO, BaO and ZnO, i.e. MgO+CaO+SrO+BaO+ZnO, is 0 to 25 mol %.

In this composition range, a glass material can be obtained easily and consistently.

It is preferable that the univalent metal ions are selected from Li, Na, K, Cs, Ag, Cu, and Au. The univalent metal ions may be contained in the glass composition as an oxide or metal. However, the univalent metal ions (R) are expressed always in terms of oxide ($R_2O$) thereof when compositions are specified in the present specification.

A glass composition desirably meets the following conditions for effectively forming a polarization structure by the poling effect.

First, the glass composition contains an element to be a source of charged particles. Second, this element can migrate in the glass composition under predetermined conditions (for instance, high temperature and a high electric field) and does not migrate in the state where it is left at room temperature. Third, the charged particles that have migrated do not lose their charges but keep their charged state even after the migration. For poling, a glass composition may be used that satisfies these conditions and causes neither devitrification nor phase separation easily so as to be suitable for an optical element.

In order to satisfy the first condition, an element that is ionized easily in the glass composition should be selected. Examples of such an element include univalent metal such as alkali metal to provide univalent ions.

In order to satisfy the second condition, an element that migrates easily in a glass network structure should be selected. Examples of such an element include elements having a small ionic radius, i.e. a low atomic weight, for example, Li among alkali metals. Since activation energy is required for ions to migrate in a glass composition, ion migration becomes exponentially easier with increase in temperature. A suitable selection of the activation energy allows ions to migrate easily at high temperature to cause polarization easily, i.e. to facilitate poling, and allows the polarization to be maintained stably at around room temperature. This activation energy can be controlled by the selection of a glass composition to a certain extent, since it is affected by the ions that migrate and the structure and components of glass.

In order to satisfy the third condition, the state where dissociated electrons are kept away from ions to prevent the ions from being neutralized again, in the case of univalent positive ions, should be generated. When existing in a glass composition together with univalent ions, Al ions have a trivalent tetracoordinated state and strongly attract electrons dissociated from the univalent ions. The glass composition containing a suitable amount of Al provides the activation energy suitable for the migration of univalent ions upon application of an electric field and can prevent ions that have migrated from being neutralized.

The present invention was achieved based on the aforementioned points of view. Hereinafter, the present invention is described further in detail by means of examples but is not limited to the following examples.

EXAMPLES

Example 1

Silicon dioxide, aluminum oxide, magnesium carbonate, zinc oxide, and sodium carbonate were used as raw materials. Each of them was weighed so that glass to be obtained had a total weight of 300 g and the composition indicated in Table 1. The raw materials thus weighed were mixed together. This batch was put into a pot made of platinum rhodium (Pt: 90% and Rh: 10%) and then was melted in an electric furnace at 1620° C. for six hours. Thereafter, the melt was poured on a stainless steel plate to be quenched rapidly. Thus a glass sample was obtained. The glass sample was annealed in the electric furnace. The glass sample thus annealed was cut and polished. Consequently, a sample with a size of 20 mm×30 mm×1 mm was obtained.

Al electrodes having an area of 20 mm×30 mm were formed by vapor deposition so as to face the respective surfaces of the sample. They were formed to serve as a cathode and an anode in poling. Poling was conducted by: putting the glass sample in the electric furnace; increasing its temperature from room temperature to 350° C.; applying a voltage of 5 kV while maintaining the temperature at 350° C.; starting to decrease the temperature 30 minutes after the start of the voltage application; and stopping the voltage application when the temperature dropped to 50° C.

With respect to the sample thus poled, the intensity of light with a wavelength of 532 nm that was a second harmonic (the SHG intensity) was measured with exciting light having a wavelength of 1064 nm by the Maker fringe method. The SHG intensity thus obtained was 3.1 times that of silica glass (Herasil, manufactured by Heraeus) poled under standard conditions.

Examples 2 to 12

Samples having different compositions from each other (see Examples 2 to 12 in Table 1) were produced in the same manner as in Example 1. Examples 2 to 4 are different from Example 1 only in the type of univalent metal ions. Examples 5 to 10 are different from Examples 1 to 4 in content of MgO and are different from one another in the type of univalent metal ions alone. In Examples 11 and 12, $B_2O_3$ was added, and they were different from each other in concentration of Na that is univalent metal. With respect to each sample, poling was carried out under the same conditions as those employed in Example 1 and the SHG intensity thereof was measured. Table 1 indicates the glass compositions, poling conditions, and SHG intensity. In all the glass samples having the compositions indicated in Table 1, a higher SHG intensity than that of silica glass was obtained.

Comparative Examples 1 to 3

Samples having compositions indicated in Table 2 were produced in the same manner as in Example 1. In Comparative Example 1, the concentration of univalent metal ions exceeds 0.5 mol %. In Comparative Example 2, the concentration of $B_2O_3$ exceeds 15 mol %. In Comparative Example 3, $Al_2O_3$ is not contained and the concentration of univalent metal ions is high. These samples also were subjected to poling under the same conditions as those employed in Example 1 and then the measurement of SHG intensity. In the samples with the compositions indicated in Table 2, the SHG intensity was low.

According to Examples and Comparative Examples described above, a preferable composition range in the present invention is as follows. In the following, each composition is indicated by mol % and the ratio between components by a mole ratio.

$SiO_2$ is a network-former in glass, and the durability of glass improves with the increase in content thereof. However, an excessive amount of $SiO_2$ makes melting difficult. Hence, the upper limit of the content of $SiO_2$ is set at 97%. A preferable content of $SiO_2$ is 50 to 97%, particularly 55 to 70%.

$B_2O_3$ is a network-former in glass, and a proper content thereof allows the durability to be maintained while decreasing melting temperature. $B_2O_3$ tends to be bonded with univalent ions and has a function of stabilizing them. Since an excessive amount of $B_2O_3$ causes phase separation or devitrification, the upper limit of the content of $B_2O_3$ is set at 15%. $B_2O_3$ has an increasing tendency to cause phase separation depending on the combination with bivalent ions. Hence, it is preferable that substantially no $B_2O_3$ is contained. In the present specification, the phrase "substantially no $B_2O_3$ is contained" denotes that the content thereof is less than 0.1%.

TABLE 1

| | (Composition Ratio: mol %) Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 68.6 | 68.6 | 68.6 | 68.6 | 68.7 | 68.7 | 68.7 | 68.7 | 68.7 | 68.7 | 67.0 | 67.0 |
| $B_2O_3$ | 0.0 | 0.0 | 0.0 | 0.0 | 0.0 | 0.0 | 0.0 | 0.0 | 0.0 | 0.0 | 10.1 | 10.1 |
| $Al_2O_3$ | 15.6 | 15.6 | 15.6 | 15.6 | 15.6 | 15.6 | 15.6 | 15.6 | 15.6 | 15.6 | 9.7 | 9.7 |
| MgO | 0.5 | 0.5 | 0.5 | 0.5 | 15.6 | 15.6 | 15.6 | 15.6 | 15.6 | 15.6 | 2.1 | 2.1 |
| CaO | 0.0 | 0.0 | 0.0 | 0.0 | 0.0 | 0.0 | 0.0 | 0.0 | 0.0 | 0.0 | 5.8 | 5.8 |
| SrO | 0.0 | 0.0 | 0.0 | 0.0 | 0.0 | 0.0 | 0.0 | 0.0 | 0.0 | 0.0 | 2.6 | 2.6 |
| BaO | 0.0 | 0.0 | 0.0 | 0.0 | 0.0 | 0.0 | 0.0 | 0.0 | 0.0 | 0.0 | 2.6 | 2.6 |
| ZnO | 15.2 | 15.2 | 15.2 | 15.2 | 0.0 | 0.0 | 0.0 | 0.0 | 0.0 | 0.0 | 0.0 | 0.0 |
| $Li_2O$ | 0.07 | 0.0 | 0.0 | 0.0 | 0.07 | 0.0 | 0.0 | 0.0 | 0.0 | 0.0 | 0.0 | 0.0 |
| $Na_2O$ | 0.0 | 0.07 | 0.0 | 0.0 | 0.0 | 0.07 | 0.0 | 0.0 | 0.0 | 0.0 | 0.07 | 0.12 |
| $K_2O$ | 0.0 | 0.0 | 0.07 | 0.0 | 0.0 | 0.0 | 0.07 | 0.0 | 0.0 | 0.0 | 0.0 | 0.0 |

TABLE 1-continued

| | | (Composition Ratio: mol %) Examples | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| $Cs_2O$ | | 0.0 | 0.0 | 0.0 | 0.07 | 0.0 | 0.0 | 0.0 | 0.0 | 0.0 | 0.0 | 0.0 | 0.0 |
| $Ag_2O$ | | 0.0 | 0.0 | 0.0 | 0.0 | 0.0 | 0.0 | 0.0 | 0.07 | 0.0 | 0.0 | 0.0 | 0.0 |
| $Cu_2O$ | | 0.0 | 0.0 | 0.0 | 0.0 | 0.0 | 0.0 | 0.0 | 0.0 | 0.07 | 0.0 | 0.0 | 0.0 |
| $Au_2O$ | | 0.0 | 0.0 | 0.0 | 0.0 | 0.0 | 0.0 | 0.0 | 0.0 | 0.0 | 0.07 | 0.0 | 0.0 |
| Poling Process | Temperature (° C.) | 350 | 350 | 350 | 350 | 350 | 350 | 350 | 350 | 350 | 350 | 420 | 420 |
| | Voltage (kV) | 5 | 4 | 4 | 4 | 5 | 4 | 4 | 5 | 5 | 5 | 4 | 4 |
| | Time (min) | 30 | 30 | 30 | 30 | 30 | 30 | 30 | 30 | 30 | 30 | 30 | 30 |
| SHG Intensity | | 3.1 | 2.5 | 2.5 | 2.1 | 2.8 | 2.2 | 2.2 | 3 | 2.2 | 3 | 1.4 | 1.2 |

TABLE 2

| | (Composition Ratio: mol %) Comparative Examples | | |
|---|---|---|---|
| | 1 | 2 | 3 |
| $SiO_2$ | 66.7 | 62.6 | 59.0 |
| $B_2O_3$ | 10.1 | 16.6 | 0.0 |
| $Al_2O_3$ | 9.7 | 8.3 | 0.0 |
| MgO | 2.1 | 0.0 | 0.0 |
| CaO | 5.8 | 0.0 | 9.1 |
| SrO | 2.6 | 0.0 | 0.0 |
| BaO | 2.6 | 12.5 | 15.3 |
| ZnO | 0.0 | 0.0 | 1.9 |
| $Na_2O$ | 0.60 | 0.07 | 6.9 |
| $K_2O$ | 0.0 | 0.0 | 3.3 |
| $ZrO_2$ | 0.0 | 0.0 | 4.5 |
| Poling Process | | | |
| Temperature (° C.) | 420 | 420 | 280 |
| Voltage (kV) | 4 | 4 | 3 |
| Time (min) | 30 | 30 | 30 |
| SHG Intensity | 0.3 | 0.03 | 0.00006 |

$Al_2O_3$ has a function of stabilizing univalent metal ions as described above and allows a depletion layer to be formed effectively. This effect is reduced with decrease in content thereof, while an excessive content thereof causes devitrification to occur easily during the production of glass. Hence, the content of $Al_2O_3$ is set in the range of 0.1 to 40%, particularly 9 to 25%. It is effective for stabilizing univalent ions to set the ratio of the number of moles of $Al_2O_3$ to the sum of moles of univalent ion oxide at 1.0 or higher, i.e. to set the number of moles of $Al_2O_3$ to be equal to or higher than the sum of moles of oxides of univalent metal ions.

The addition of suitable amounts of MgO, CaO, SrO, and BaO that are oxides of alkaline-earth metals improves meltability and stability of glass. The addition of excessive amounts thereof, however, causes phase separation or devitrification. It is preferable that the contents of respective oxides are in the range of 0 to 25%. Zn also is a bivalent ion like an alkaline earth ion. Preferably, the content of ZnO also is in the range of 0 to 25%. Furthermore, it is preferable that the sum of all the oxides of these bivalent ions also is in the range of 0 to 25%.

It is preferable that a univalent ion to be contained in the present invention is at least one of Li, Na, K, and Cs of alkali metal ions and Ag, Cu, and Au of transition metal ions. The mobility of these ions increases with decrease in their radii, and those with smaller radii migrate easily upon application of voltage. The suitable selection of ion species can provide the conditions for poling with a degree of freedom according to other limitations. Furthermore, in glass, for example, containing a large amount of $SiO_2$ and having high viscosity, the viscosity may be lowered considerably in melting glass even in the case of using a small amount of univalent ions within the above-mentioned range. Moreover, when a plurality of such univalent ions are selected, an effect of mixing univalent ions, typified by a so-called mixed alkali effect, is produced. Hence, a plurality of univalent ions can be used for adjusting the electrical resistance and viscosity of glass.

Ag, Cu, and Au are ions that are polarized more easily as compared to alkali metal ions. Accordingly, they are convenient for improving the poling effect to increase the nonlinear optical effect.

When the poling process is carried out, a frozen-in electric field is formed in at least a part of glass to produce the nonlinear optical effect. Generally, the frozen-in electric field is formed in the vicinity of the surface of a glass sample brought into contact with an anode in the poling process. In the glass composition according to the present invention, the applied voltage puts univalent cations into glass and thereby the electric field is frozen inside glass. The nonlinear optical effect of glass that has been subjected to the poling depends on the thickness and intensity of the frozen-in electric field.

The present invention encompasses a glass functional product obtained by poling a glass composition according to the present invention, and a glass functional product containing a glass composition according to present invention and having a frozen-in electric field in at least a part of the composition.

As described above, the use of a glass composition of the present invention allows a periodic polarization structure to be introduced into a glass material consistently. Thus, a nonlinear optical element (a second-harmonic generator) using glass can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass functional product, obtained by poling a glass composition comprising 0.001 to 0.5 mol % of univalent metal ions in terms of oxide thereof, 0.1 to 40 mol % of $Al_2O_3$, and 0 to 15 mol % of $B_2O_3$, wherein a ratio of the number of moles of $Al_2O_3$ to a sum of moles of oxide in terms of which the univalent metal ions is expressed is at least 1.0 and the univalent metal ions are selected from a group consisting of Li, Na, K, Cs, and Au.

2. A glass frictional product, comprising a glass composition comprising 0.001 to 0.5 mol % of univalent metal ions in terms of oxide thereof, 0.1 to 40 mol % of $Al_2O_3$, and 0 to 15 mol % of $B_2O_3$, wherein a ratio of the number of moles of $Al_2O_3$ to a sum of moles of oxide in terms of which the univalent metal ions is expressed is at least 1.0 and the univalent metal ions are selected from a group consisting of Li, Na, K, Cs, and Au, and having a frozen-in electric field in a part of the glass composition.

3. A glass composition for poling, comprising 0.001 to 0.5 mol % of univalent metal ions in terms of oxide thereof, 67 to 75 mol % of $SiO_2$, 9 to 25 mol % of $Al_2O_3$, and 0 to 15 mol % of $B_2O_3$, wherein a ratio of the number of moles of $Al_2O_3$ to a sum of moles of oxide in terms of which the univalent metal ions is expressed is at least 1.0 and the univalent metal ions are selected from a group consisting of Cs and Au.

4. The glass composition for poling according to claim 3, comprising, in terms of mol %: 0.001% to 0.5% of univalent metal ions in terms of oxide thereof; 9 to 25% of $Al_2O_3$; 67 to 75% of $SiO_2$; 0 to 15% of $B_2O_3$; 0 to 25% of MgO; 0 to 25% of CaO; 0 to 25% of SrO; 0 to 25% of BaO; and 0 to 25% of ZnO, wherein the sum of MgO, CaO, SrO, BaO and ZnO is 0 to 25 mol %.

5. The glass composition for poling according to claim 3, comprising substantially no $B_2O_3$.

6. A glass functional product, obtained by poling a glass composition comprising 0.001 to 0.5 mol % of univalent metal ions in terms of oxide thereof, 9 to 25 mol % of $Al_2O_3$, and 0 to 15 mol % of $B_2O_3$, wherein a ratio of the number of moles of $Al_2O_3$, to a sum of moles of oxide in terms of which the univalent metal ions is expressed is at least 1.0.

7. A glass functional product, comprising a glass composition comprising 0.001 to 0.5 mol % of univalent metal ions in terms of oxide thereof, 9 to 25 mol % of $Al_2O_3$, and 0 to 15 mol % of $B_2O_3$, wherein a ratio of the number of moles of $Al_2O_3$ to a sum of moles of oxide in terms of which the univalent metal ions is expressed is at least 1.0, and having a frozen-in electric field in a part of the glass composition.

8. A glass composition for poling, comprising 0.001 to 0.5 mol % of univalent metal ions in terms of oxide thereof, 67 to 70 mol % of $SiO_2$, 9 to 25 mol % of $Al_2O_3$, and 0 to 15 mol % of $B_2O_3$, wherein a ratio of the number of moles of $Al_2O_3$ to a sum of moles of oxide in terms of which the univalent metal ions is expressed is at least 1.0 and the univalent metal ions are selected from a group consisting of Li, Na, K. Cs, and Au.

* * * * *